United States Patent
Jang et al.

(10) Patent No.: US 9,084,259 B2
(45) Date of Patent: Jul. 14, 2015

(54) METHOD FOR MAINTAINING DIRECT DEVICE-TO-DEVICE COMMUNICATION IN WIRELESS ACCESS SYSTEM SUPPORTING DEVICE-TO-DEVICE COMMUNICATION AND APPARATUS FOR SUPPORTING SAME

(75) Inventors: Jiwoong Jang, Anyang-si (KR); Hangyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/233,678

(22) PCT Filed: Jul. 17, 2012

(86) PCT No.: PCT/KR2012/005696
§ 371 (c)(1),
(2), (4) Date: Jan. 17, 2014

(87) PCT Pub. No.: WO2013/012241
PCT Pub. Date: Jan. 24, 2013

(65) Prior Publication Data
US 2014/0235234 A1    Aug. 21, 2014

Related U.S. Application Data

(60) Provisional application No. 61/508,700, filed on Jul. 18, 2011.

(51) Int. Cl.
*H04W 36/00* (2009.01)
*H04W 36/18* (2009.01)
*H04W 76/04* (2009.01)

(52) U.S. Cl.
CPC ........ *H04W 76/045* (2013.01); *H04W 36/0072* (2013.01); *H04W 36/18* (2013.01); *H04W 76/043* (2013.01)

(58) Field of Classification Search
CPC .......... H04W 36/0072; H04W 76/023; H04W 76/043
See application file for complete search history.

(56) References Cited

U.S. PATENT DOCUMENTS

2009/0016232 A1*  1/2009  Kwon et al. .................. 370/252
2013/0102314 A1*  4/2013  Koskela et al. .............. 455/436

FOREIGN PATENT DOCUMENTS

| KR | 10-2009-0005601 A | 1/2009 |
| KR | 10-2009-0062435 A | 6/2009 |
| KR | 10-2011-0043179 A | 4/2011 |

OTHER PUBLICATIONS

3GPP TS 22.368 V10.2.0, Service Requirements for Machine-Type Communications (MTC); Stage 1 (Release 10), Sep. 30, 2010.

*Primary Examiner* — George Eng
*Assistant Examiner* — Nam Huynh
(74) *Attorney, Agent, or Firm* — McKenna Long & Aldridge LLP (57) ABSTRACT

The present invention discloses methods for maintaining direct device-to-device communication when one device from devices that are in direct device-to-device communication performs a handover, and apparatuses for supporting same. A method for maintaining the direct device-to-device communication in the wireless access system, according to one embodiment of the present invention, comprises the steps of: a second device moving to a second base station of a target cell; and the second device receiving from a first device of serving cell resource allocation information on a newly allocated resource region for direct device-to-device communication, wherein the resource allocation information can be received through an existing device-to-device link (D2D link), which is formed for direct device-to-device communication between the second device and the first device.

10 Claims, 6 Drawing Sheets

METHOD FOR MAINTAINING DIRECT
DEVICE-TO-DEVICE COMMUNICATION IN
WIRELESS ACCESS SYSTEM SUPPORTING
DEVICE-TO-DEVICE COMMUNICATION
AND APPARATUS FOR SUPPORTING SAME

This application is a 35 USC §371 National Stage entry of International Application No. PCT/KR2012/005696, filed on Jul. 17, 2012, and claims priority to U.S. Provisional Application No. 61/508,700 filed Jul. 18, 2011, each of which is hereby incorporated by reference in its entirety.

TECHNICAL FIELD

The present invention relates to a wireless access system supporting communication between devices, and more particularly, to methods for maintaining device-to-device direct communication if one of devices which perform device-to-device direct communication performs handover, and an apparatus for supporting the same.

BACKGROUND ART

Hereinafter, a device to device communication environment will be described.

Device to device (D2D) communication refers to communication between an electronic device and another electronic device. In a broad sense, D2D communication refers to wire or wireless communication between electronic devices or communication between a machine and a device controlled by a person. However, it is general that D2D communication recently refers to wireless communication between electronic devices performed without control of a person.

In the early 1990s when D2D communication has been introduced, D2D communication has been recognized as remote control or telematics and D2D communication markets have been very restrictive. However, D2D communication markets have received attention all over the world since D2D communication had been able to grow rapidly for last several years. Particularly, D2D communication has exerted its great influence at point of sales (POS) and security related application markets in the fields of fleet management, remote monitoring of machine and facilities, measurement of working time on construction machine facilities, and smart meter automatically measuring heat or the use of electricity. It is expected that D2D communication will be used for various purpose of uses in association with the existing mobile communication and low power communication solutions such as wireless high-speed Internet, Wi-Fi, and Zigbee and that its coverage will be extended to business to consumer (B2C) markets without limitation to business to business (B2B) markets.

In the D2D communication age, since all machines provided with a subscriber identity module (SIM) card may be able to perform data transmission and reception, they may remotely be controlled. For example, D2D communication technologies may be used for many machines and equipments such as cars, trucks, trains, containers, vending machines, and gas tanks. In this way, application ranges of D2D communication technologies are very broad.

However, in a state that D2D direct communication is performed, if one D2D device performs handover, a corresponding D2D link may be disconnected. In this case, studies for a method for maintaining D2D direct communication without seamlessness have not been performed sufficiently.

DISCLOSURE

Technical Problem

An object of the present invention devised to solve the conventional problem is to provide a reliable communication method for a D2D device.

Another object of the present invention is to provide methods for maintaining D2D direct communication if one of devices, which perform D2D direct communication, performs handover.

Other object of the present invention is to provide a method for allocating resources for a D2D device if the D2D device performs handover.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, the present invention suggests methods for maintaining D2D direct communication if one of devices, which perform D2D direct communication, performs handover, and apparatuses for supporting the same.

In one aspect of the present invention, a method for maintaining device-to-device (D2D) direct communication in a wireless access system that supports D2D direct communication comprises the steps of a second device moving to a second base station of a target cell; and the second device receiving from a first device of a serving cell resource allocation information on a newly allocated resource region for the D2D direct communication in the target cell, wherein the resource allocation information is received through an existing D2D link, which is configured for D2D direct communication between the second device and the first device.

The method may further comprise the step of the first base station of the serving cell transmitting one or more of resource information on the existing D2D link and information on the second device to the second base station.

Also, the method may further comprise the steps of the second base station transmitting the resource allocation information to the first base station of the serving cell through a backhaul link; and the first base station transmitting the resource allocation information to the first device.

If the second device moves to the second cell, the D2D direct communication between the second device and the first device is preferably performed through the resource region indicated by the resource allocation information.

In still another aspect of the present invention, a method for maintaining device-to-device (D2D) direct communication in a wireless access system that supports D2D direct communication comprises the steps of a first base station transmitting resource information on resources used for the D2D direct communication to a second base station; the first base station receiving resource allocation information, which is newly allocated for the D2D direct communication from a second cell controlled by the second base station, from the second base station; and the first base station transmitting the resource allocation information to a first device, wherein the resource allocation information is transmitted to a second device, which performs handover to the second base station, through a D2D link where D2D direct communication is performed between devices which are configured conventionally.

In this case, the first base station and the second base station may transmit and receive the resource information and the resource allocation information through a backhaul link.

In other aspect of the present invention, a second device for maintaining device-to-device (D2D) direct communication in a wireless access system that supports D2D direct communication comprises a receiver; and a processor configured to maintain the D2D direct communication.

In this case, the second device may move to a second base station of a target cell and receive from a first device of a serving cell resource allocation information on a newly allocated resource region for the D2D direct communication in the target cell, through the receiver. The resource allocation information may be received through an existing D2D link, which is configured for D2D direct communication between the second device and the first device.

Also, the first base station of the serving cell may transmit one or more of resource information on the existing D2D link and information on the second device to the second base station.

In this case, the second base station may transmit the resource allocation information to the first base station of the serving cell through a backhaul link, and the first base station may transmit the resource allocation information to the first device. If the second device moves to the second cell, the D2D direct communication between the second device and the first device may be performed through the resource region indicated by the resource allocation information.

The above aspects of the present invention are only a part of the embodiments of the present invention, and various embodiments based on technical features of the present invention may be devised and understood by the person with ordinary skill in the art based on the detailed description of the present invention.

Advantageous Effects

According to the embodiments of the present invention, the following advantages may be obtained.

First of all, a reliable communication method for D2D devices may be provided even in case that the D2D devices perform handover.

Second, if one D2D device of devices, which perform D2D direct communication, performs handover, D2D direct communication may be maintained without seamlessness.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

The embodiments of the present invention disclose methods for maintaining D2D direct communication if a D2D device performs handover in a wireless access system that supports D2D environment, and apparatuses for supporting the same.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will not be disclosed. Also, procedures or steps that may be understood by the person with ordinary skill in the art will not be disclosed.

In this specification, the embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. At this time, the base station (BS) may be replaced with terms such as a fixed station, Node B, eNode B (eNB), an advanced base station (ABS), and an access point (AP).

Also, in the present invention, a D2D device means a user equipment that performs communication between devices, and may simply be referred to as a device. Also, the D2D device may be replaced with terms such as a user equipment (UE), a mobile station (MS), a subscriber station (SS), a mobile subscriber station (MSS), a mobile terminal, a terminal, a device, or a machine to machine (M2M) device.

Furthermore, a transmitting side means a fixed or mobile node that transmits data services or voice services while a receiving side means a fixed or mobile node that receives data services or voice services. Accordingly, in an uplink, the mobile station could be the transmitting side while the base station could be the receiving side. Likewise, in a downlink, the mobile station could be the receiving side while the base station could be the transmitting side.

The embodiments of the present invention may be supported by standard documents disclosed in at least one of wireless access systems, i.e., IEEE 802.xx system, 3GPP system, 3GPP LTE system, and 3GPP2 system. Namely, among the embodiments of the present invention, steps or parts which are not described may be supported by the above standard documents.

Also, all terminologies disclosed herein may be described by the above standard documents. Particularly, the embodiments of the present invention may be supported by one or more of the 3GPP LTE/LTE-A standard documents.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

The embodiments of the present invention will be described in detail with reference to the accompanying drawings to be easily carried out by the person with ordinary skill in the art to which the present invention pertains. However, it is to be understood that the present invention may be implemented by various modifications and is not limited to the embodiments which will be described herein. In the drawings, parts which are not related with the description of the present invention will be omitted to clarify the present invention. Wherever possible, the same reference numbers will be used throughout the drawings to refer to the same or like parts.

In this specification, when some part "includes" some elements, it means that the part may further include other elements unless mentioned to the contrary. Also, terminologies " . . . part," " . . . block," and " . . . module" mentioned in this specification mean a unit processing at least one function or operation, and may be implemented by hardware, software or combination of hardware and software.

Also, specific terminologies hereinafter used in the embodiments of the present invention are provided to assist understanding of the present invention, and various modifications may be made in the specific terminologies within the range that they do not depart from technical spirits of the present invention.

For example, in the embodiments of the present invention, a multicast traffic indication (MTI) field may be used to refer to a multicast paging message indication field, and a reliable traffic indication (RTI) field may be used to refer to a reliable paging message indication field. Also, the terminology 'traffic' may be used to refer to the terminology 'data.

1. General D2D Communication

In the embodiments of the present invention, communication between D2D devices means a communication type performed between (1) user equipments through a base station (e.g, controlled D2D) and between (2) a base station and user equipments without control of a user, or between (3) a communication type between D2D devices (e.g., uncontrolled D2D). Accordingly, the D2D device means a user equipment that can support communication between the D2D devices.

An access service network for D2D service will be defined as a D2D access service network (ASN), and a network entity that performs communication with D2D devices will be referred to as a D2D server. The D2D server performs D2D application, and provides D2D specific service for one or more D2D devices. D2D feature is a feature of D2D application, and one or more features may be required to provide application. D2D device group means a group of D2D devices that share one or more features.

Devices (that may be referred to as various terms such as D2D device, D2D communication device, and machine type communication (MTC) device) that perform communication in a D2D mode will be increased gradually in a certain network as their device application types are increased.

Examples of device application types include (1) security, (2) public safety, (3) tracking and tracing, (4) payment, (5) healthcare, (6) remote maintenance and control, (7) metering, (8) consumer device, (9) fleet management at POS (Point Of Sales) and security related application market, (10) communication between devices of vending machines, (11) remote controlling of machine and facilities, measurement of working time on construction machine facilities, and smart meter automatically measuring heat or the use of electricity, and (12) surveillance video communication of a surveillance camera. However, the device application types are not limited to the above examples, and the other various device application types may be used.

Another feature of the D2D device is low mobility or has no mobility once the D2D device is installed. That is, low mobility or no mobility means that the D2D device is stationary for a long time. The D2D communication system may simplify or optimize mobility-associated operations for a specific D2D application having a fixed location such as secured access and surveillance, public safety, payment, remote maintenance and control, and metering.

Figure 1:
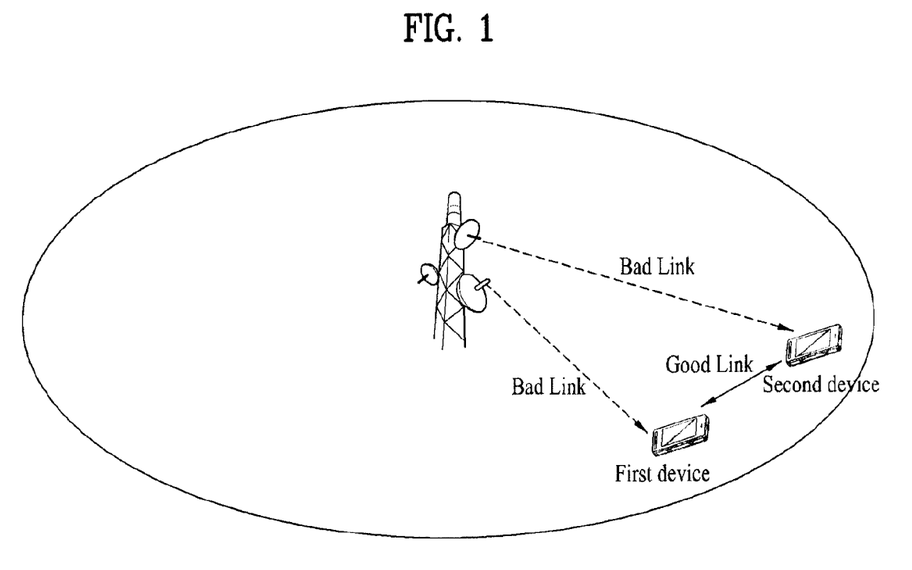
FIG. 1 is a diagram illustrating one of direct communication methods between D2D devices.

FIG. 1 is a diagram illustrating one of direct communication methods between D2D devices.

D2D direct communication is performed between D2D devices, which are located at a short distance from each other or has good channel statuses, by a direct link to save the power and resources as compared with communication through a base station. In particular, in case of D2D devices (for example, the first device and the second device) located at a short distance from the cell edge as illustrated in FIG. 1, the resources and power saving advantage due to D2D direct communication is very great.

For example, if the base station and the D2D device are respectively connected to a link (that is, controlled D2D status), since the D2D device should reserve uplink and downlink resources, in case of two D2D devices, a total of four radio resources are reserved by the D2D devices. However, in case of D2D direct communication, since a link between the D2D devices is only connected, two radio resources are reserved by the D2D devices. Accordingly, D2D direct communication has the greater resources and power saving advantage than that of communication through a cellular network. Also, although FIG. 1 illustrates that two D2D devices perform D2D direct communication, more than two D2D devices may perform D2D direct communication.

Figure 2:
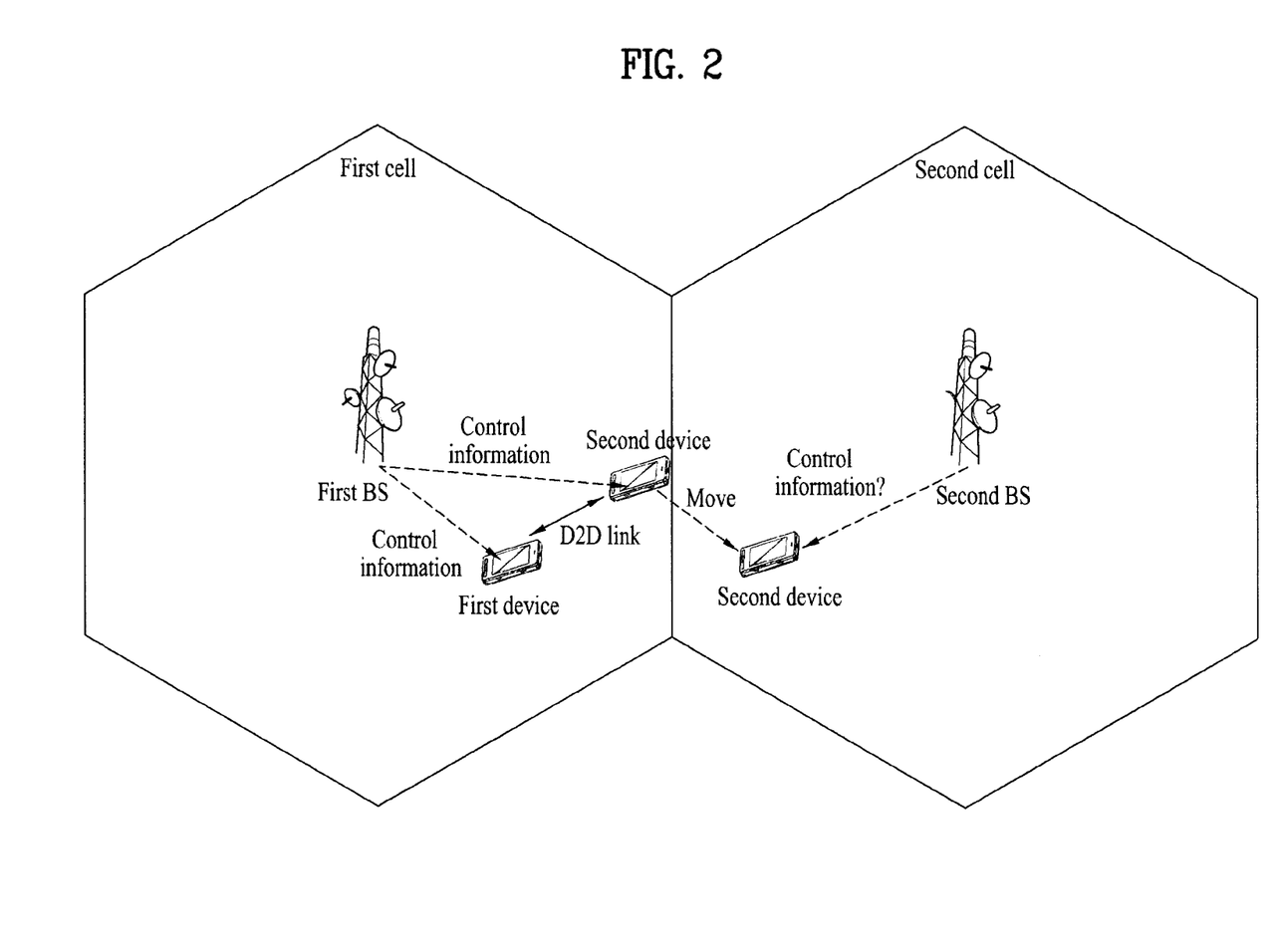
FIG. 2 is a diagram illustrating that one D2D device performs handover during D2D direct communication.

FIG. 2 is a diagram illustrating that one D2D device performs handover during D2D direct communication.

In FIG. 2, a first cell and a second cell are adjacent to each other, and a first base station and a second base station control the first cell and the second cell, respectively. A first device and a second device perform D2D direct communication in the first cell through a D2D link, and are controlled by the base station in the first cell. However, as the second device moves to the second cell, the second device performs handover with the second base station.

D2D direct communication may be performed between two D2D adjacent devices at the cell edge more efficiently than the existing cellular network. However, in this case, if the D2D device has mobility, it is likely that one (that is, second device) of the D2D devices moves to its adjacent cell (that is, second cell) as shown in FIG. 2.

In D2D direct communication that should be controlled by the base station (BS) that controls each cell, if one of the D2D devices performs handover to another cell, a link of D2D direct communication between the D2D devices may be disconnected. Hereinafter, various methods for maintaining D2D direct communication in a state that a D2D device performs handover will be described.

2. General D2D Device

Figure 3:
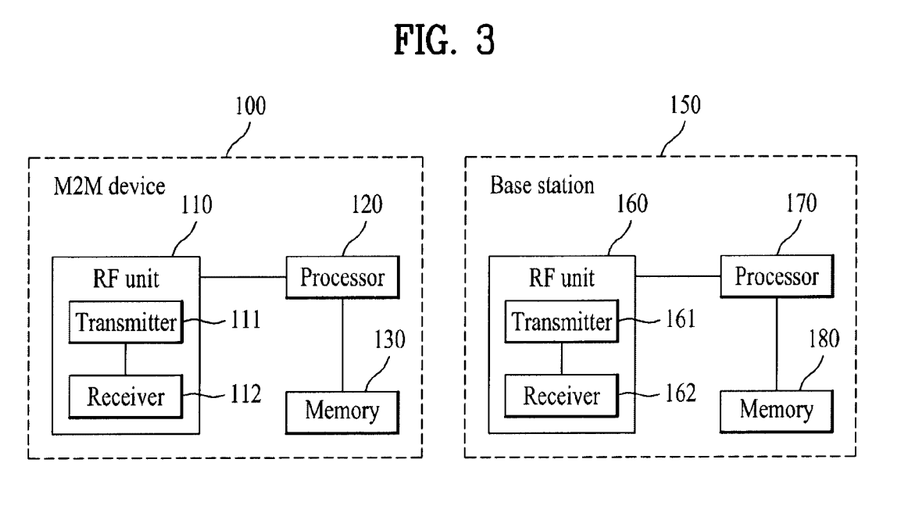
FIG. 3 is a brief diagram illustrating configurations of a D2D device and a base station in accordance with the embodiment of the present invention.

FIG. 3 is a brief diagram illustrating configurations of a D2D device and a base station in accordance with one embodiment of the present invention.

In FIG. 3, each of a D2D device 100 and a base station 150 may include a radio frequency (RF) unit 110, 160, and a processor 120, 170. Each of the D2D device and the base station may selectively include a memory 130, 180. Although FIG. 3 illustrates one D2D device and one base station, a D2D communication environment may be configured among a plurality of D2D devices and base stations.

Each RF unit 110, 160 may include a transmitter 111, 161 and a receiver 112, 162. In case of the D2D device 100, the transmitter 111 and the receiver 112 may be configured to transmit and receive a signal to and from the base station 150 and other D2D devices, and the processor 120 may be functionally connected with the transmitter 111 and the receiver 112 to control the signal transmission and reception procedure of the transmitter 111 and the receiver 112 to and from other devices. Also, the processor 120 performs various kinds of processing for a signal for transmission and then transmits the processed signal to the transmitter 111, and may perform processing for the signal received by the receiver 112.

The processor 120 may store information included in the exchanged message in the memory 130 if necessary. The D2D device 100 configured as above may perform methods of various embodiments of the present invention which will be described later.

In the meantime, although not shown in FIG. 3, the D2D device 100 may include various additional elements in accordance with its device application type. For example, if the corresponding D2D device 100 is for smart metering, the corresponding D2D device 100 may include additional element for power measurement. An operation for power measurement may be controlled by the processor 120 shown in FIG. 3, or may be controlled by a separate processor (not shown).

Although FIG. 3 illustrates an example of communication performed between the D2D device 100 and the base station 150, a method for D2D communication according to the present invention may be performed between one or more D2D devices, each of which may perform the method according to various embodiments, which will be described later, in the same manner as each device shown in FIG. 3.

In case of the base station 150, the transmitter 161 and the receiver 162 may be configured to transmit and receive a signal to and from another base station, D2D server and D2D devices, and the processor 170 may be functionally connected with the transmitter 161 and the receiver 162 to control the signal transmission and reception procedure of the transmitter 161 and the receiver 162 to and from other devices. Also, the processor 170 performs various kinds of processing for a signal for transmission and then transmits the processed signal to the transmitter 161, and may perform processing for the signal received by the receiver 162. The processor 170 may store information included in the exchanged message in the memory 180 if necessary. The base station 150 configured as above may perform the methods of various embodiments which have been described as above.

Each processor 120, 170 of the D2D device 110 and the base station 150 commands (for example, controls, coordinates or manages) the operation of each of the D2D device 110 and the base station 150. Each processor 120, 170 may be connected with the memory 130, 180 that stores program codes and data therein. The memory 130, 180 is connected with the processor 120, 170 and stores an operating system, an application, and general files therein.

The processor 120, 170 of the present invention may be referred to as a controller, a microcontroller, a microprocessor, or a microcomputer. In the meantime, the processor 120, 170 may be implemented by hardware, firmware, software, or their combination. If the embodiments of the present invention are implemented by hardware, the processor 120, 170 may include application specific integrated circuits (ASICs), digital signal processors (DSPs), digital signal processing devices (DSPDs), programmable logic devices (PLDs), and field programmable gate arrays (FPGAs).

In the mean time, if the embodiments of the present invention are implemented by firmware or software, the firmware or software may be configured to include a module, a procedure, or a function, which performs functions or operations of the present invention. The firmware or software may be provided in the processor 120, 170 or may be stored in the memory 130, 180 and then may be driven by the processor 120, 170.

3. Method for Maintaining D2D Direct Communication—1

D2D communication between the devices through the base station and/or direct communication between devices, for scheduling, such as resource allocation, controlled by the base station will be referred to as controlled D2D direct communication. Hereinafter, if one of D2D devices, which perform controlled D2D direct communication, moves to another cell (that is, handover), an operation of the device, which performs D2D direct communication, will be described.

Figure 4:
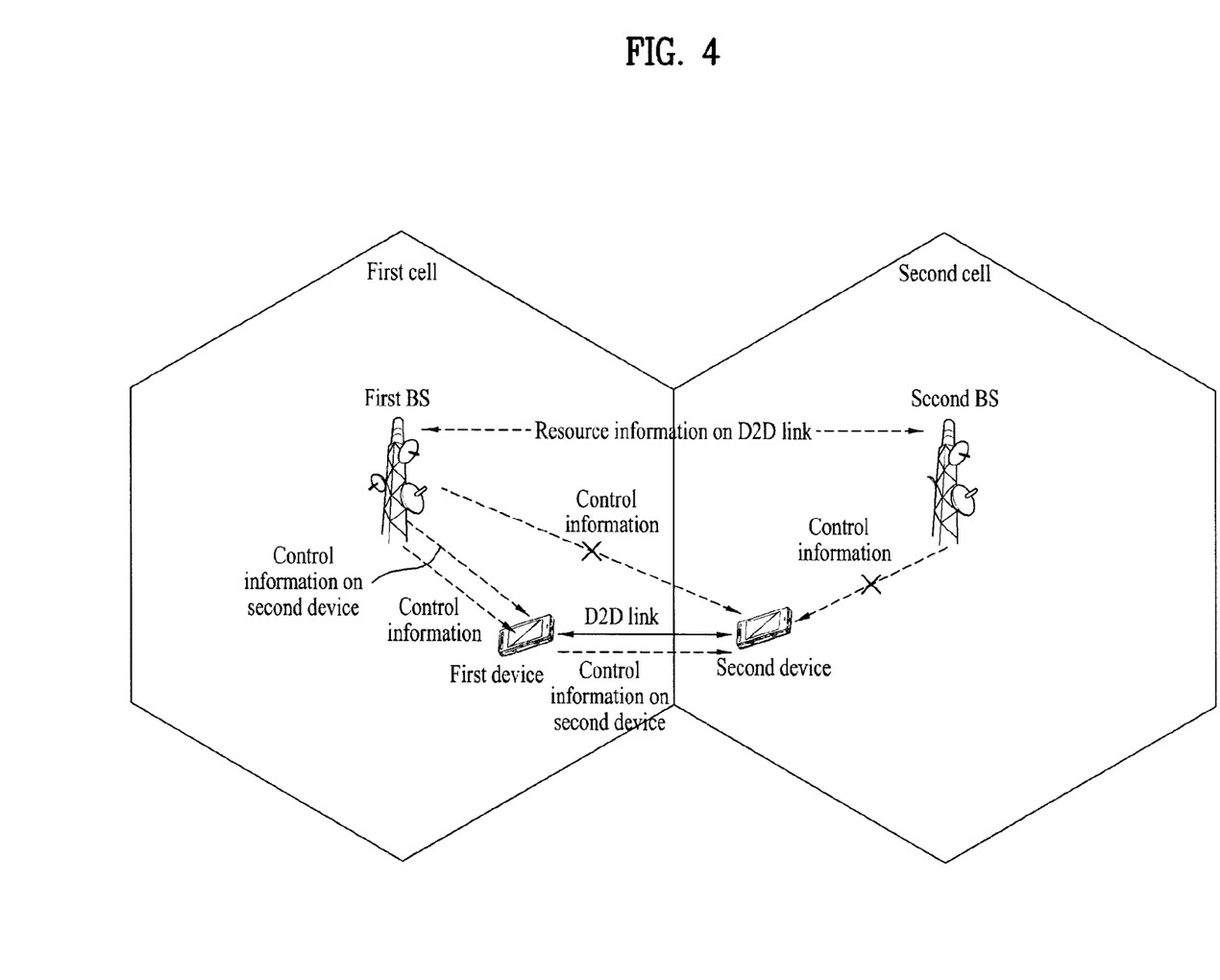
FIG. 4 is a diagram illustrating a method for maintaining D2D direct communication during handover in accordance with the embodiment of the present invention.

FIG. 4 is a diagram illustrating a method for maintaining D2D direct communication during handover in accordance with the embodiment of the present invention.

In FIG. 4, a first cell and a second cell are adjacent to each other, and a first base station and a second base station control the first cell and the second cell, respectively. A first device and a second device perform D2D direct communication in the first cell through a D2D link. As the second device moves to the second cell, the second device performs handover with the second base station.

At this time, if a D2D device (second device), which is performing controlled D2D direct communication, performs handover to the second base station, the second device may acquire control information through the first device in which the existing D2D link is set. In the embodiments of the present invention, the control information includes resource information which is newly allocated to the D2D link, wherein the resource information may include a bandwidth, a time slot, a subframe, interference information per resource, etc.

The second device that has moved to another cell (that is, second cell) may receive the control information for the second cell from the first base station of the first cell which is the existing serving cell, through the D2D link with the first device. In other words, even though the second device performs handover to the second cell, the second device may maintain a control channel of the existing D2D link for transmitting and receiving the control information.

However, a new control channel may be configured in the existing D2D link to transmit and receive the control information of the base station between the first device and the second device.

Referring to FIG. 4, if the second device performs handover to the second cell, the first base station which was the serving base station cannot directly control the second device any more. In this case, methods for reallocating resources for the D2D link will be described hereinafter.

If the D2D device performs handover, the base stations of the serving cell (that is, first cell) and a target cell (that is, second cell) which is a target of handover, should know information on radio resources allocated to the D2D link to efficiently manage the resources. Also, it is preferable to determine a base station that will perform control for the corresponding link.

As the second device performs handover to the second cell, reconfiguration of the resources for the existing D2D link may be required. This is because that the resources allocated from the respective cells to the respective D2D devices may be different from each other, and that the resources having no interference with the D2D link in the first cell may act as interference in the second cell. Accordingly, the resources for the D2D link may be reconfigured by the radio resources having the smallest interference. However, even in this case, if the radio resources allocated to the D2D link which is performing D2D direct communication are still effective, the D2D link currently in service may be used continuously.

However, if the radio resources allocated to the D2D link which is performing D2D direct communication are not effective any more, the first base station and the second base station should reconfigure the resources for D2D direct communication. At this time, since the second base station does not control the second device yet, resource information for the D2D link for the second device located in the area of the second cell may be transmitted to the second device through the D2D link which is not released yet.

Figure 5:
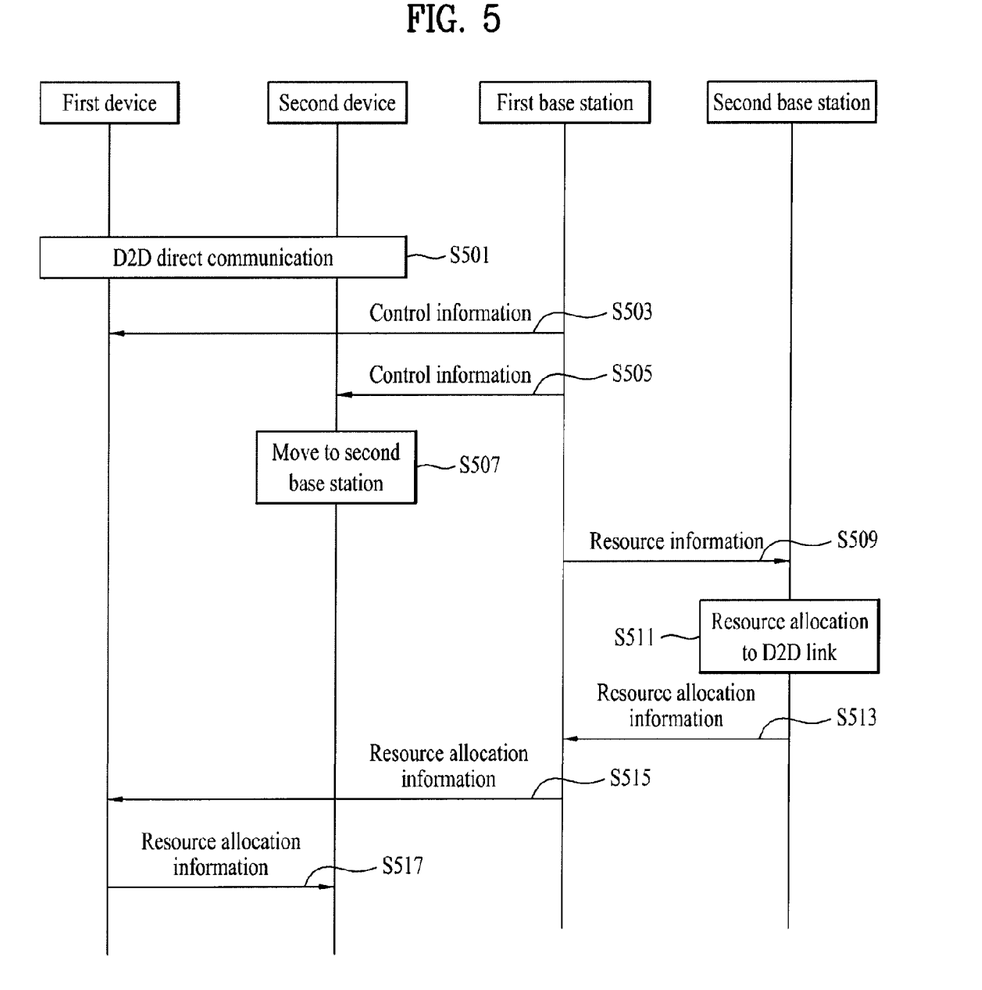
FIG. 5 is a diagram illustrating one of methods for reallocating resources when a D2D device performs handover in accordance with the embodiment of the present invention.

FIG. 5 is a diagram illustrating one of methods for reallocating resources when a D2D device performs handover in accordance with the embodiment of the present invention.

Hereinafter, if the radio resources allocated to the D2D link which is performing D2D direct communication are not effective as shown in FIG. 4, a method for newly allocating resources for D2D direct communication from the second base station will be described in detail. Referring to FIG. 5, the first device and the second device perform D2D direct communication within the first cell of the first base station (S501).

At this time, since the first device and the second device perform controlled D2D direct communication, they receive the control information from the first base station which is the serving base station (S503, S505).

The second device has mobility, and may move to the second cell in accordance with a user (S507).

If the second device moves to the second cell, the second device cannot receive the control information from the first base station since the second device is located within the area of the second cell (see FIG. 4). At this time, the first base station recognizes that the second device has moved to the second cell managed by the second base station. For example, if the second device moves to the second cell, the first base station may receive information on movement from the first device to the second device or information on direct movement from the second device, or may recognize that the second device has moved to another cell through disconnection of the control channel from the second device.

Accordingly, the first base station may transmit the resource information on the D2D link between the first device and the second device and/or the information on the second device to the second base station through a backhaul link or a backbone network (S509).

The second base station allocates radio resources for the D2D link which will be used in the second cell, on the basis of the resource information on the D2D link and/or the information on the second device, and transmits resource allocation information on the allocated radio resources to the first base station through the backhaul link (S511, S513).

The first base station transmits the resource allocation information, which is received from the second base station, to the first device, and the first device transmits resource allocation information of the second base station to the second device through the D2D link which is maintained (S515, S517).

The reason why the resource allocation information is transmitted through the first device without being directly transmitted from the second base station to the second device is that the second device does not complete handover to the second base station, and that transmission through the first device is more effective than that a new control channel is formed between the second device and the second base station because the existing D2D link is not released completely.

In the aforementioned embodiments, the base station (second base station) of the cell (second cell) where the D2D device (for example, second device) which is performing D2D direct communication newly enters may regard the resource information transmitted from the neighboring base station (first base station) through the backhaul link as the resource currently used by the first cell. Accordingly, the second base station may allocate resources for the D2D link with reference to an inter-cell interference coordination (ICIC) scheme.

Also, in the aforementioned embodiments, if the radio resource for the D2D link is completely used as D2D direct communication ends, the base station that controls D2D direct communication may report to the base station, which manages the cell, through the backhaul link to which the D2D device belongs, that the resource is not used any more as D2D direct communication ends. For example, after the second device performs handover to the second base station, if D2D direct communication with the first device is completed, the first base station may report to the second base station through the backhaul link that D2D direct communication between the first device and the second device has ended.

Also, in the aforementioned embodiments, if a new control link for the second device that has moved to the second base station is configured, the control channel for transmitting and receiving the control information between the second device and the first base station will be disconnected.

4. Method for Maintaining D2D Direct Communication—2

Figure 6:
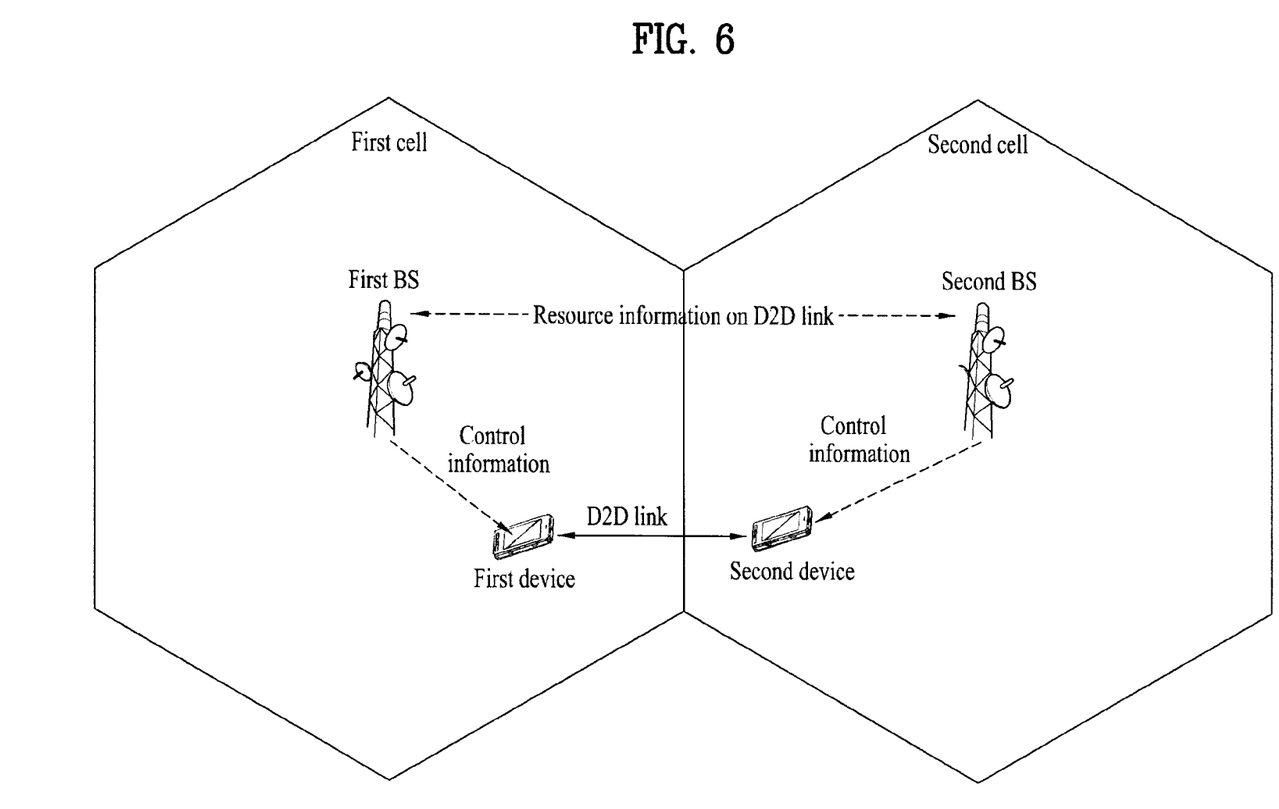
FIG. 6 is a diagram illustrating another method for maintaining D2D direct communication during handover in accordance with the embodiment of the present invention.

FIG. 6 is a diagram illustrating another method for maintaining D2D direct communication during handover in accordance with the embodiment of the present invention.

In FIG. 6, a first cell and a second cell are adjacent to each other, and a first base station and a second base station control the first cell and the second cell, respectively. A first device and a second device perform D2D direct communication in the first cell through a D2D link, and as the second device moves to the second cell, the second device performs handover with the second base station. At this time, if a resource for maintaining the D2D link is newly allocated to the second device while the second device is moving to the second device, the procedure described in FIG. 5 may be performed.

The D2D device that has moved from the existing cell (for example, first cell) to another cell (for example, second cell) may perform a handover procedure with the second base station of the second cell. At this time, the handover procedure may be performed through the same procedure as that of the 3GPP LTE (Rel-8) system. In other words, the first base station of the existing cell is the serving base station, and the second base station of the second cell which is another cell is the target base station.

In FIG. 6, each of the D2D devices which perform D2D direct communication may transmit and receive control information to and from the base station only, which manages each cell to which each D2D device belongs. For example, since the first device is located in the area of the first cell, the first device may receive the control information from the first base station. Also, since the second device is located in the area of the second cell, the second device may receive the control information from the second base station.

At this time, it is preferable that one main controller is provided even though the D2D link for D2D direct communication is controlled by each of the base stations of the two cells. In this case, the main controller means the base station that allocates and manages resources for the D2D link used by the D2D devices.

If the D2D link for D2D direct communication is controlled by each of the base stations of the two cells, the main controller may be the first base station which is the serving base station that conventionally controls the D2D link.

Alternatively, if the D2D link for D2D direct communication is controlled by each of the base stations of the two cells, the main controller may be the second base station which is the target base station to which the second device performs handover.

5. Method for Maintaining D2D Direct Communication—3

In the methods for maintaining D2D direct communication as described in the above sections 4 and 5, it is assumed that the control channel for the D2D link is maintained continuously while the second device is performing handover to the second cell. However, methods for releasing the control channel will be described hereinafter.

If the D2D devices, which are performing controlled D2D direct communication, configure the control channel with the base station only if necessary for resource allocation and then do not maintain the control channel, it may be regarded that the D2D devices which are performing D2D direct communication are in an idle mode in view of the cellular network as far as separate communication is not performed. In this case, if the D2D device which is performing D2D direct communication moves to another cell, the D2D device may be operated as follows.

5.1 All operations follow the method of the section 4 if the D2D device is controlled by the first base station that controls the existing cell (for example, first cell).

5.2 The second device is allocated with a new resource from the base station that controls a cell newly entered through a network re-entry procedure for changing from an idle mode to an active mode. At this time, the procedure after connection of the control channel with the corresponding base station follows the method described in the section 5.

6. Method for Transmitting and Receiving Control Information Between Base Stations If two D2D devices which are performing D2D direct communication belong to their respective cells different from each together, it may be required that control information should be transmitted and received between two base stations to configure or maintain a D2D link.

If the control information is transmitted and received between the two base stations, the base stations may transmit and receive the control information through a backhaul link.

Alternatively, if the control information is transmitted and received between the two base stations, the base stations may transmit and receive the control information to and from each other by using the D2D link configured between the D2D devices. For example, the first base station may transmit the control information, which is desired to be transmitted to the second base station, to the D2D device (first device) existing in its cell, and the first device may transmit the corresponding control information to the second device through the D2D link. The second device may transmit the received control information to the second base station.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention may be applied to various wireless access systems. Examples of the various wireless access systems include 3GPP (3rd Generation Partnership Project) system, 3GPP2 system and/or IEEE 802.xx (Institute of Electrical and Electronic Engineers 802) system. The embodiments of the present invention may be applied to all the technical fields based on the various wireless access systems as well as the various wireless access systems.

The invention claimed is:

1. A method for maintaining device-to-device (D2D) direct communication in a wireless access system that supports D2D direct communication, the method performed by a second device and comprising:
    moving to a second base station of a target cell; and
    receiving, from a first device of a serving cell, resource allocation information on a newly allocated resource region for the D2D direct communication in the target cell,
    wherein the resource allocation information is received through an existing D2D link, which is configured for D2D direct communication between the second device and the first device.

2. The method according to claim 1, further comprising: transmitting, from the first base station of the serving, one or more of resource information on the existing D2D link and information on the second device to the second base station.

3. The method according to claim 2, further comprising:
    transmitting, from the second base station, the resource allocation information to the first base station of the serving cell through a backhaul link; and
    the first base station transmitting the resource allocation information to the first device.

4. The method according to claim 3, wherein the D2D direct communication between the second device and the first device is performed through the resource region indicated by the resource allocation information, after the second device moves to the second cell.

5. A method for maintaining device-to-device (D2D) direct communication in a wireless access system that supports D2D direct communication, the method performed by a first base station and comprising:

transmitting resource information on resources used for the D2D direct communication to a second base station;

receiving resource allocation information which is newly allocated for the D2D direct communication from a second cell controlled by the second base station, from the second base station; and transmitting the resource allocation information to a first device, wherein the resource allocation information is transmitted to a second device which performs handover to the second base station, through an existing D2D link where D2D direct communication is performed between devices.

6. The method according to claim 5, wherein the first base station and the second base station transmit and receive the resource information and the resource allocation information through a backhaul link.

7. A second device for maintaining device-to-device (D2D) direct communication in a wireless access system that supports D2D direct communication, the second device comprising:

a receiver; and a processor configured to maintain the D2D direct communication, wherein the second device moves to a second base station of a target cell and receives from a first device of a serving cell resource allocation information on a newly allocated resource region for the D2D direct communication in the target cell, through the receiver, and the resource allocation information is received through an existing D2D link, which is configured for D2D direct communication between the second device and the first device.

8. The second device according to claim 7, wherein the first base station of the serving cell transmits one or more of resource information on the existing D2D link and information on the second device to the second base station.

9. The second device according to claim 8, wherein the second base station transmits the resource allocation information to the first base station of the serving cell through a backhaul link, and the first base station transmits the resource allocation information to the first device.

10. The second device according to claim 9, wherein the D2D direct communication between the second device and the first device is performed through the resource region indicated by the resource allocation information after the second device moves to the second cell.

\* \* \* \* \*